(12) United States Patent
Kulkarni

(10) Patent No.: US 8,782,277 B2
(45) Date of Patent: Jul. 15, 2014

(54) SYSTEM AND METHOD FOR TIME-SENSITIVE URI MAPPING

(75) Inventor: Sarang Kulkarni, Mason, OH (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 2198 days.

(21) Appl. No.: 11/549,023

(22) Filed: Oct. 12, 2006

(65) Prior Publication Data
US 2008/0091843 A1 Apr. 17, 2008

(51) Int. Cl.
*G06F 15/173* (2006.01)

(52) U.S. Cl.
USPC .......................................... 709/239; 709/238

(58) Field of Classification Search
USPC ............................................. 709/238–239
See application file for complete search history.

(56) References Cited

U.S. PATENT DOCUMENTS

| | | | |
|---|---|---|---|
| 2005/0140694 A1* | 6/2005 | Subramanian et al. | 345/619 |
| 2006/0288119 A1* | 12/2006 | Kim et al. | 709/238 |
| 2007/0260705 A1* | 11/2007 | Armstrong et al. | 709/217 |

OTHER PUBLICATIONS

Seo web page on archive.org dated Sep. 10, 2004, URL Redirect.*
Zann Marketing web page on archive.org dated May 13, 2006, Different text based on date (php).*
devX web page, Redirect Based on Time of Day Using JavaScript, dated Jun. 4, 1999.*
Coding Forums web page, "url redirect based on time & day of week", dated Mar. 13, 2003.*
"Tip of the Day Redirect Based on Time of Day Using JavaScript" at http://www.devx.com/tips/Tip/13026, Jun. 4, 1999.*
SEO web publication on redirect http://www.seocompany.ca/seo/url-redirect.html recorded on archive.org dated Sep. 10, 2004.*
"Tutorial—Giving search engine spiders direction with a 301 redirect" at http://www.tamingthebeast.net/articles3/spiders-301-redirect.html recorded on archive.org dated Jun. 4, 2003.*
"Different forms of redirects: permanent 301, temporary 302, javascript, meta-refresh" at http://oyoy.eu/huh/redirects/ recorded on archive.org dated Jun. 11, 2007.*

* cited by examiner

*Primary Examiner* — Linglan Edwards

(57) ABSTRACT

A system, method, and computer program for supporting legacy URIs. A method includes receiving a request for a uniform resource identifier and initializing the request with at least an expiration identifier. The expiration identifier is one of a date, NOW, and NEVER. The method also include determining a redirection type based on a current date. If the current date is less than the expiration identifier or equal to NEVER, then use a meta tag redirect; and if the current date is greater than or equal to said expiration identifier or equal to NOW, then use a status code redirect. The method also includes mapping the URI to a redirect-URI. Corresponding systems and computer-readable instructions are also discussed.

11 Claims, 3 Drawing Sheets

SYSTEM AND METHOD FOR TIME-SENSITIVE URI MAPPING

TECHNICAL FIELD

The presently preferred embodiment of the innovations described herein relate generally to URI redirect methods. More specifically, the presently preferred embodiment relates to time-sensitive URI mapping.

BACKGROUND

Much of the Internet today is characterized by the World Wide Web, or Web for short. The Web is based on an idea of a uniform syntax for global identifiers of network-retrievable documents, referred to as "document names", "Web addresses" and "Uniform Resource Locators." Uniform Resource Locators, or URLs, is misleading, since not all identifiers are locators, and even for those that are, it is not the defining characteristic. By the time the RFC 1630 formally defined the term Uniform Resource Identifier (or URI) as a generic term best suited for the concept, the term "URL" gained widespread popularity, and is a synonym for URI. A typical URI is in the form of:

http://example.com:8080/cgi-bin/
animal?species=bird#Texas where "http://" is the scheme, "example.com" is the host, "8080" is the port (a port of 80 is used if no port is included in the URI), "/cgi-bin/animal" is the path, "species?bird" is the query, and "Texas" is the fragment.

Typically, host, port, and path remain constant for any given web application, and users of the Web rely on the static location of web pages for Internet enjoyment. Consequently, those users will identify a frequently visited URI by adding a bookmark to their browser for easy return, where the bookmark identifies the URI of the particular page. As the Web evolves, so do web applications that might require the modification of any part of the URI, e.g., the host, port or the path. If the user accesses a web page via a bookmarked location, the user will be disappointed if the information at that location has changed without proper notification.

Luckily, redirection techniques to send the user from the old URI to the new URI are available when an intentional move is properly identified. Two of the most common techniques are use of the HTML meta refresh tag and use of the HTTP Status Code 301. In the first technique, the HTTP response header contains the following:

<META http-equiv="refresh" content="WAIT_TIME;
URL=NEW_URL">

The body of the response page can contain any normal HTML and that HTML will be displayed by the user's agent/browser. When the user's browser reads this META tag, it will wait for the duration of WAIT_TIME and display the returned HTML. After the expiration of WAIT_TIME, the user browser automatically requests the URI specified in NEW_URL. The advantage with this technique, is the user can read any information coded into the response body before the expiration of WAIT_TIME. The disadvantage, though, is over the past few years the use of the META tag refresh has been abused by spammers and phishers to confuse visitors about which web site they are visiting.

In the second technique, the browser is sent a HTTP Status Code 301 that corresponds to "Resource Moved Permanently." The new location is specified in the HTTP "location" header, using PHP for example:

<?
header("HTTP/1.1 301 Moved Permanently");
header("Status: 301 Moved Permanently");
header("Location: http://www.new-url.com");
?>

When such a response is received, the user agent will make a request to the URI specified in the Location header. The advantage with this technique is two fold. First the redirect to the new URI is automatic, so it is transparent to the user. Second search engines properly index URIs redirected by this method rather than being potentially de-indexed for using the META tag refresh technique, discussed above. The act of de-indexing a URI from various search engines ensures that that URI will not resolve following a search request. The disadvantage with this second technique, however, is that there is no notification to the user that the page has been moved and to re-set the bookmark to the desired information. Consequently, the user will continue to go to the redirected URI via the 301 redirect technique until the 301 redirect is completely removed resulting in a 404 error—page not found—response to the user.

What is needed is a method that combines the two mentioned redirect techniques that (1) provides the user with a redirect notification for a period of time, and (2) automatically redirects the user following the expiration of the time period.

SUMMARY

To achieve the foregoing, and in accordance with the purpose of the presently preferred embodiment as broadly described herein, the present application provides a method for supporting legacy URIs, comprising the steps of receiving a request for a data; initializing said request with at least an expiration identifier; determining a redirection type based on a current date, comprising the steps of if said current date is less than said expiration identifier, then use a meta tag redirect; and if said current date is greater than or equal to said expiration identifier, then use a status code redirect; mapping said URI to a redirect-URI. The method, wherein said data is in the form of a uniform resource identifier. The method, wherein said expiration identifier is a date. The method, wherein said expiration identifier is a special format. The method, wherein said expiration identifier is one of a date or a special format. The method, further comprising the step of determining a redirection type based on a special format, comprising the steps of: if said special format is NOW, then use a status code redirect; and if said special format is NEVER, then use a meta tag redirect.

Another advantage of the presently preferred embodiment is to provide a method of supporting legacy URIs, comprising the steps of: receiving a request for a uniform resource identifier; initializing said request with at least an expiration identifier, wherein said expiration identifier is one of a date, NOW, and NEVER; determining a redirection type based on a current date, comprising the steps of: if said current date is less than said expiration identifier or equal to NEVER, then use a meta tag redirect; and if said current date is greater than or equal to said expiration identifier or equal to NOW, then use a status code redirect; mapping said URI to a redirect-URI.

And another advantage of the presently preferred embodiment is to provide a method of supporting legacy resource locations, comprising the steps of: initializing a request for a resource location with at least an expiration; determining a redirection type based on a criteria, comprising the steps of: if said criteria is less than said expiration, then use a first redirect; and if said criteria is greater than or equal to said expiration, then use a second redirect; and mapping said resource location to a redirect resource location.

Yet another advantage of the presently preferred embodiment is to provide a computer-program product tangibly embodied in a machine readable medium to perform a method of supporting legacy URIs, comprising: instructions for receiving a request for a data; instructions for initializing said request with at least an expiration identifier; instructions for determining a redirection type based on a current date, comprising instructions for: if said current date is less than said expiration identifier, then use a meta tag redirect; and if said current date is greater than or equal to said expiration identifier, then use a status code redirect; instructions for mapping said URI to a redirect-URI. The computer-program product, wherein said data is in the form of a uniform resource identifier. The computer-program product, wherein said expiration identifier is a date. The computer-program product, wherein said expiration identifier is a special format. The computer-program product, wherein said expiration identifier is one of a date or a special format. The computer-program product, further comprising instructions for the step of determining a redirection type based on a special format, comprising instructions for: if said special format is NOW, then use a status code redirect; and if said special format is NEVER, then use a meta tag redirect.

Still another advantage of the presently preferred embodiment is to provide a computer-program product tangibly embodied in a machine readable medium to perform a method of supporting legacy URIs, comprising: instructions for receiving a request for a uniform resource identifier; instructions for initializing said request with at least an expiration identifier, wherein said expiration identifier is one of a date, NOW, and NEVER; instructions for determining a redirection type based on a current date, comprising instructions for: if said current date is less than said expiration identifier or equal to NEVER, then use a meta tag redirect; and if said current date is greater than or equal to said expiration identifier or equal to NOW, then use a status code redirect; instructions for mapping said URI to a redirect-URI.

And yet another advantage of the presently preferred embodiment is to provide a computer-program product tangibly embodied in a machine readable medium to perform a method of supporting legacy resource locations, comprising: instructions for initializing a request for a resource location with at least an expiration; instructions for determining a redirection type based on a criteria, comprising instructions for: if said criteria is less than said expiration, then use a first redirect; and if said criteria is greater than or equal to said expiration, then use a second redirect; and instructions for mapping said resource location to a redirect resource location.

And still another advantage of the presently preferred embodiment is to provide a data processing system having at least a processor and accessible memory to implement a method for supporting legacy resource locations, comprising: means for receiving a request for a data; means for initializing said request with at least an expiration identifier; means for determining a redirection type based on a current date, comprising the steps of: if said current date is less than said expiration identifier, then use a meta tag redirect; and if said current date is greater than or equal to said expiration identifier, then use a status code redirect; means for mapping said URI to a redirect-URI.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 3:
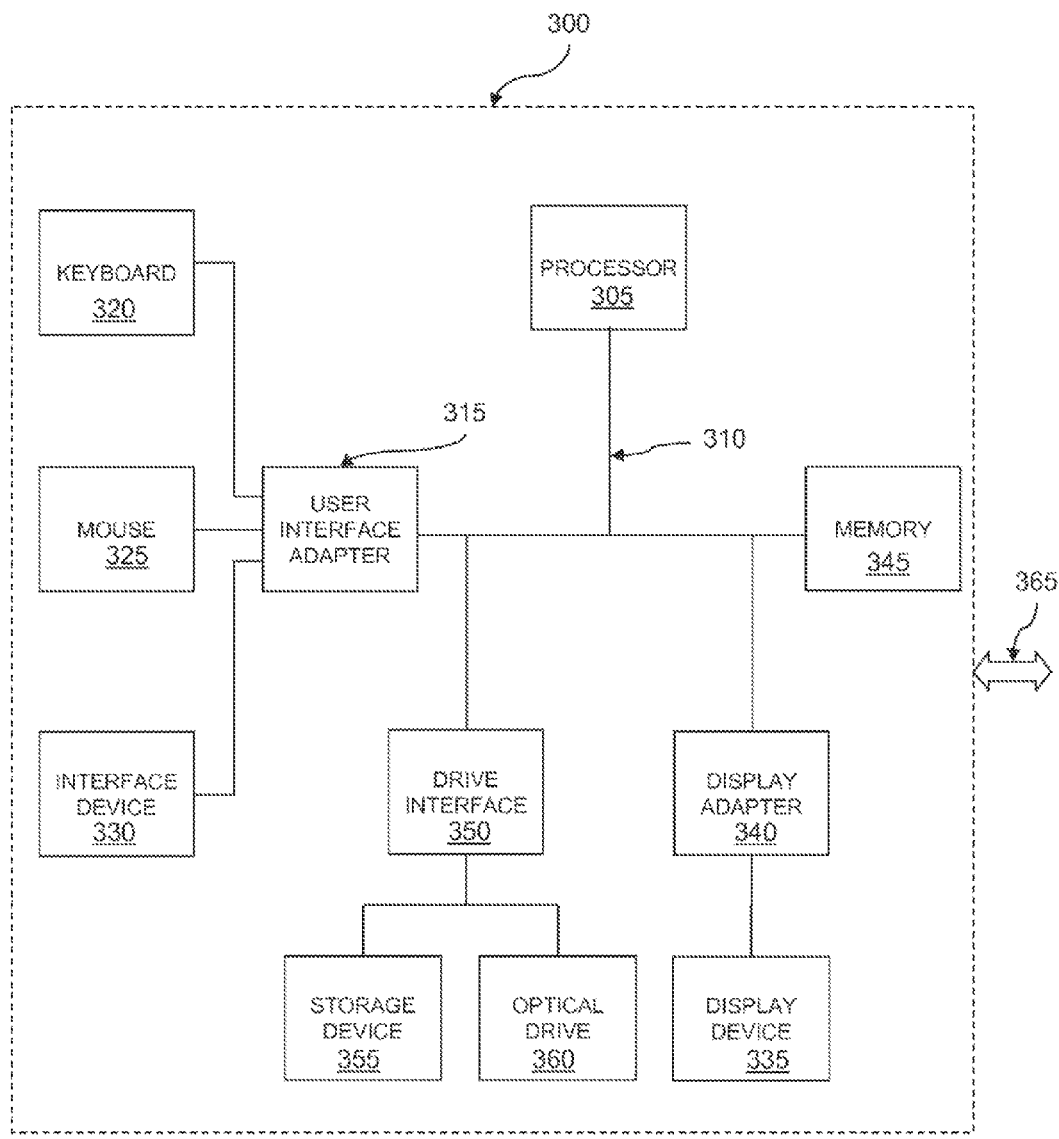
FIG. 3 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of time-sensitive URI mapping. Now therefore, in accordance with the presently preferred embodiment, an operating system executes on a computer, such as a general-purpose personal computer. FIG. 3 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 3, an exemplary system for implementing the presently preferred embodiment includes a general-purpose computing device in the form of a computer 300, such as a desktop or laptop computer, including a plurality of related peripheral devices (not depicted). The computer 300 includes a microprocessor 305 and a bus 310 employed to connect and enable communication between the microprocessor 305 and a plurality of components of the computer 300 in accordance with known techniques. The bus 310 may be any of several types of bus structures including a memory bus or memory controller, a peripheral bus, and a local bus using any of a variety of bus architectures. The computer 300 typically includes a user interface adapter 315, which connects the microprocessor 305 via the bus 310 to one or more interface devices, such as a keyboard 320, mouse 325, and/or other interface devices 330, which can be any user interface device, such as a touch sensitive screen, digitized pen entry pad, etc. The bus 310 also connects a display device 335, such as an LCD screen or monitor, to the microprocessor 305 via a display adapter 340. The bus 310 also connects the microprocessor 305 to a memory 345, which can include ROM, RAM, etc.

The computer 300 further includes a drive interface 350 that couples at least one storage device 355 and/or at least one optical drive 360 to the bus. The storage device 355 can include a hard disk drive, not shown, for reading and writing to a disk, a magnetic disk drive, not shown, for reading from or writing to a removable magnetic disk drive. Likewise the optical drive 360 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 300.

The computer 300 can communicate via a communications channel 365 with other computers or networks of computers. The computer 300 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 345 of the computer 300. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
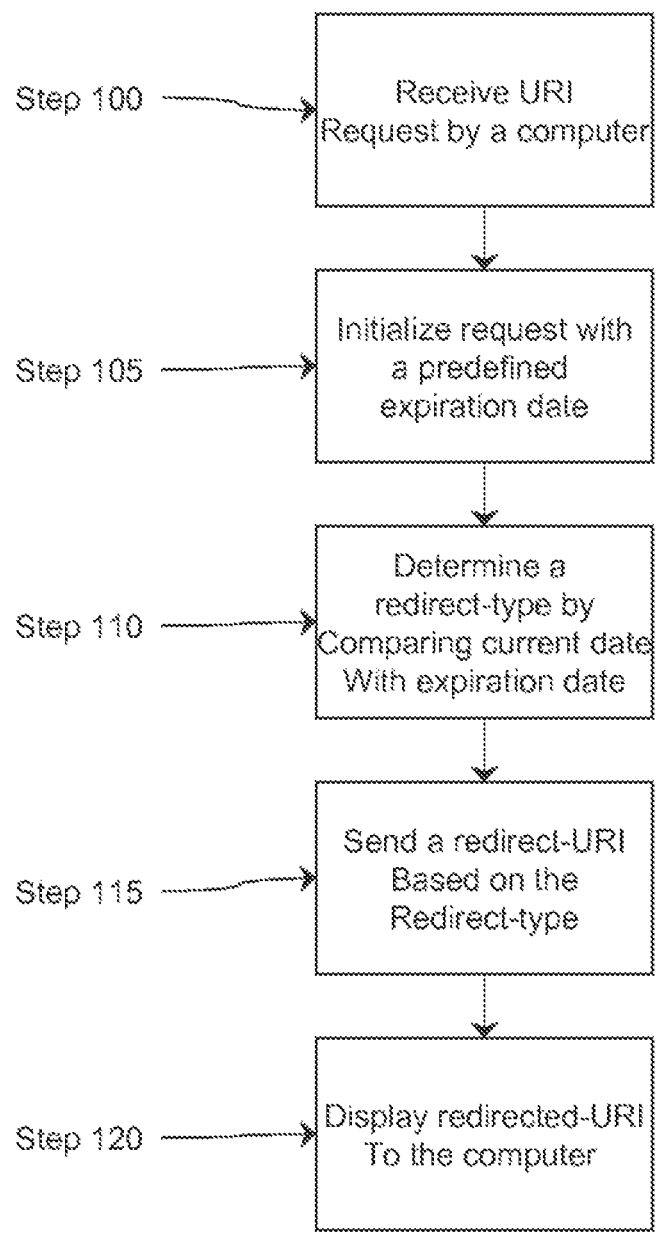
FIG. 1 is a flowchart of a system and method for time-sensitive URI mapping.

FIG. 1 is a flowchart of a system and method for time-sensitive URI mapping. Referring to FIG. 1, the method and system receive a URI request from a user agent (Step 100); initialize the request with a predefined expiration date (Step 105); determine a redirection type by comparing the current date with the expiration date (Step 110); and present the redirection type to the client computer (Step 115) to display the redirected-URI for access by a user (Step 120).

Figure 2:
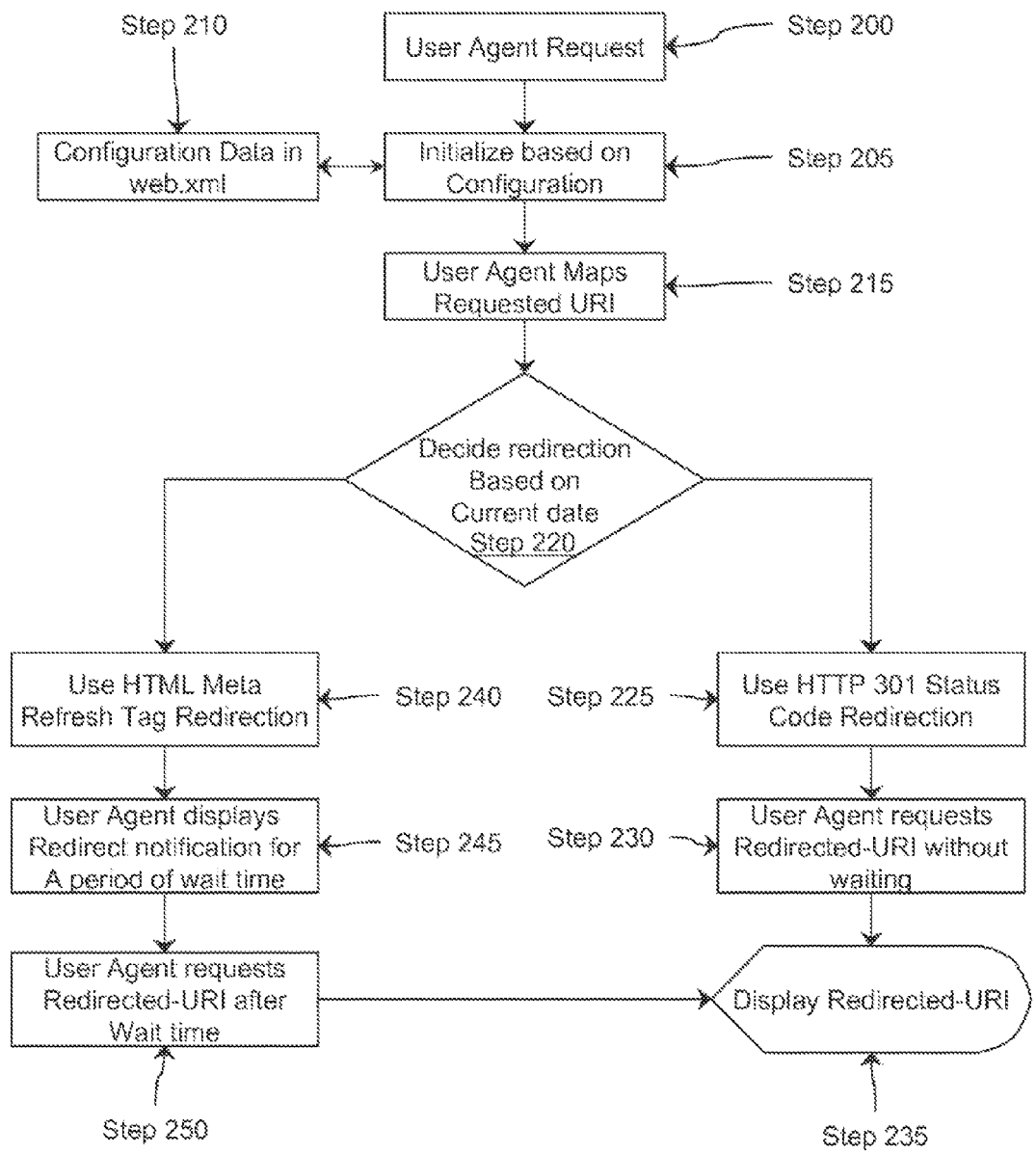
FIG. 2 is a flow chart of the URI mapping and redirection techniques disclosed in the presently preferred embodiment.

FIG. 2 is a flowchart of the URI mapping and redirection techniques disclosed in the presently preferred embodiment. Referring to FIG. 2, the user agent, a thin client for example, initiates a request for a page of data identified by a uniform resource identifier (or URI) (Step 200) in a distributed multi-tiered application like that used in the lava Enterprise Edition platform, where a current date is defined by known means. Using techniques commonly understood in the art of programming lava Servlets and J2EE application, the request is initialized (Step 205) based on configuration data located in a deployment descriptor, such as a web.xml file, where an expiration identifier is defined (Step 210). The expiration identifier can be in a date format, or a special format, such as NOW and NEVER. It is understood that a lava Servlet is a small lava program that runs within a web server, where the servlet receives and responds to requests from web clients across HTTP. Having initiated the necessary redirect behavior, the user agent maps the requested URI using known methods to direct the user agent to the requested resource (Step 215).

The requested URI is instead redirected to a redirect-URI based on time-sensitive information by comparing the current date with the expiration identifier. The special format of NEVER is used to configure that a notification message should always be displayed using the META refresh tag. Also, when a blank or otherwise invalid date is specified, it is equivalent to the special format of NEVER. The special format of NOW is used to configure that a notification message should not be displayed at all, and only a HTTP 301 redirection.

If the expiration identifier is not in the special format, it is compared with the current date, and if the expiration identifier is less than the current date, then the HTTP 301 redirection is used (Step 225) so that the user agent is transparently redirected from the requested URI to the redirect-URI (Step 230). The redirected-URI is then displayed (Step 235) to the user agent.

If the expiration identifier is not in the special format, it is compared with the current date and if the expiration identifier is greater than the current date, then the META tag refresh technique is used (Step 240). The user agent receives a timed notification that the requested URI has changed (Step 245). The user agent is then redirected to the redirect-URI once the timed notification expires (Step 250), e.g., 10 seconds, for display to the user agent (Step 235).

For example, if the user agent uses the following to access data:
http://host: 8080/cgi-bin/car/ABC1234DEF567
but the data has been relocated to:
http://H/new_host:7001/program/webclient/ABC1234DEF567
and the host:8080 server has the expiration identifier that has already occurred, or the special format of NOW, in its configuration information, the web server performs a 301 redirect and transparently sends the user agent to the second URI.

Likewise, for example, if the user agent uses the following to access data:
http://host:8080/cgi-bin/car/ABC1234DEF567
but the data has been relocated to:
http://H/new_host:7001/program/webclient/ABC1234DEF567
and the host:8080 server has the expiration identifier that has yet to occur, or the special format of NEVER, in its configuration information, the web server performs a META tag refresh and displays the timed notification before refreshing the user agent and redirects the user agent to the redirected-URI.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as utilizing advance URI mapping logic to determine which URI the user agent should be directed to. Likewise, the system could determine when to switch from META tag refresh to 301 redirect by frequency of page visits as identified from a cookie. Alternatively, the switch from META tag refresh to 301 redirect could occur based on referring URI or originating domain name, for example. Another embodiment within the scope of the claims is the ability to automatically update the favorites or bookmark file for the user agent should the requested URI send the user agent to the redirected-URI. Therefore, other implementations are within the scope of the following claims.

What is claimed is:

1. A method of supporting legacy URIs, comprising the steps of:
   receiving a request for a data in a data processing system;
   initializing said request with at least an expiration identifier by the data processing system, wherein said expiration identifier is a special format;
   determining, by the data processing system, a redirection type based on a current date, comprising the steps of
      if said current date is less than said expiration identifier, then use a meta tag redirect; and
      if said current date is greater than or equal to said expiration identifier, then use a status code redirect;
   mapping said URI to a redirect-URI by the data processing system according to the determined redirection type.

2. The method of claim 1, wherein said data is in the form of a uniform resource identifier.

3. A method of supporting legacy URIs, comprising the steps of:
   receiving a request for a data in a data processing system;
   initializing said request with at least an expiration identifier by the data processing system;
   determining a redirection type by the data processing system based on a special format, comprising the steps of:
      if said special format is NOW, then use a status code redirect; and
      if said special format is NEVER, then use a meta tag redirect; and
   mapping said URI to a redirect-URI by the data processing system according to the determined redirection type.

4. A method of supporting legacy URIs, comprising the steps of:
   receiving a request for a uniform resource identifier in a data processing system;
   initializing said request, by the data processing system, with at least an expiration identifier, wherein said expiration identifier is one of a date, NOW, and NEVER;
   determining, by the data processing system, a redirection type based on a current date, comprising the steps of
      if said current date is less than said expiration identifier or equal to NEVER, then use a meta tag redirect; and
      if said current date is greater than or equal to said expiration identifier or equal to NOW, then use a status code redirect;
   mapping, by the data processing system, said URI to a redirect-URI according to the determined redirection type.

5. A method of supporting legacy resource locations, comprising the steps of:
   initializing, in a data processing system, a request for a resource location with at least an expiration identifier, wherein said expiration identifier is a special format;
   determining, by the data processing system, a redirection type based on a criteria, comprising the steps of;
      if said criteria is less than said expiration, then use a first redirect type; and
      if said criteria is greater than or equal to said expiration, then use a second redirect type; and
   mapping, by the data processing system, said resource location to a redirect resource location according to the determined redirection type.

6. A non-transitory machine readable medium encoded with computer-executable instructions that, when executed, cause a data processing system to perform a method of supporting legacy URIs, comprising:
   receiving a request for a data;
   initializing said request with at least an expiration identifier, wherein said expiration identifier is a special format;
   determining a redirection type based on a current date, comprising:
      if said current date is less than said expiration identifier, then use a meta tag redirect; and
      if said current date is greater than or equal to said expiration identifier, then use a status code redirect;
   mapping said URI to a redirect-URI according to the determined redirection type.

7. The machine readable medium of claim 6, wherein said data is in the form of a uniform resource identifier.

8. A non-transitory machine readable medium encoded with computer-executable instructions that, when executed, cause a data processing system to perform a method of supporting legacy URIs, comprising:
   receiving a request for a data;
   initializing said request with at least an expiration identifier;
   the step of determining a redirection type based on a special format, comprising:
      if said special format is NOW, then use a status code redirect; and
      if said special format is NEVER, then use a meta tag redirect; and
   mapping said URI to a redirect-URI according to the determined redirection type.

9. A non-transitory machine readable medium encoded with computer-executable instructions that, when executed, cause a data processing system to perform a method of supporting legacy URIs, comprising:
   receiving a request for a uniform resource identifier;

initializing said request with at least an expiration identifier, wherein said expiration identifier is one of a date, NOW, and NEVER;
determining a redirection type based on a current date, comprising:
if said current date is less than said expiration identifier or equal to NEVER, then use a meta tag redirect; and
if said current date is greater than or equal to said expiration identifier or equal to NOW, then use a status code redirect;
mapping said URI to a redirect-URI according to the determined redirection type.

10. A non-transitory machine readable medium encoded with computer-executable instructions that, when executed, cause a data processing system to perform a method of supporting legacy resource locations, comprising:
initializing a request for a resource location with at least an expiration identifier, wherein said expiration identifier is a special format;
determining a redirection type based on a criteria, comprising:
if said criteria is less than said expiration, then use a first redirect type; and
if said criteria is greater than or equal to said expiration, then use a second redirect type; and
mapping said resource location to a redirect resource location according to the determined redirection type.

11. A data processing system comprising: a processor and accessible memory, wherein the data processing system is to implement a method for supporting legacy resource locations by performing the steps of:
receiving a request for a data;
initializing said request with at least an expiration identifier, wherein said expiration identifier is a special format;
determining a redirection type based on a current date, comprising the steps of
if said current date is less than said expiration identifier, then use a meta tag redirect; and
if said current date is greater than or equal to said expiration identifier, then use a status code redirect;
mapping said URI to a redirect-URI according to the determined redirection type.

* * * * *